June 21, 1966 A. G. BODINE, JR 3,256,695
SONIC METHOD AND APPARATUS FOR FORMING TRENCHES AND
FOR LAYING PIPE LINES THEREIN
Filed Feb. 13, 1963 10 Sheets-Sheet 1
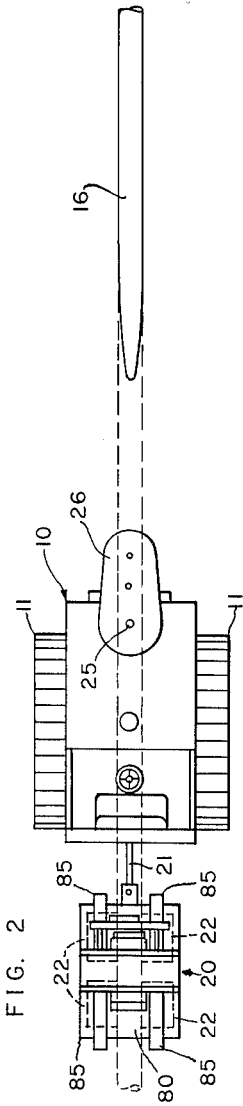
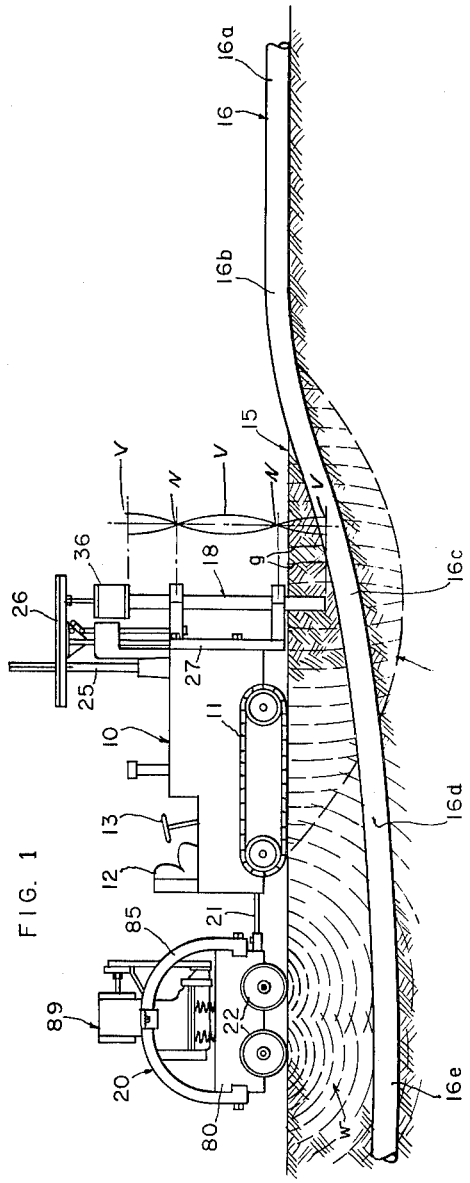
INVENTOR.
ALBERT G. BODINE JR.
BY
ATTORNEY

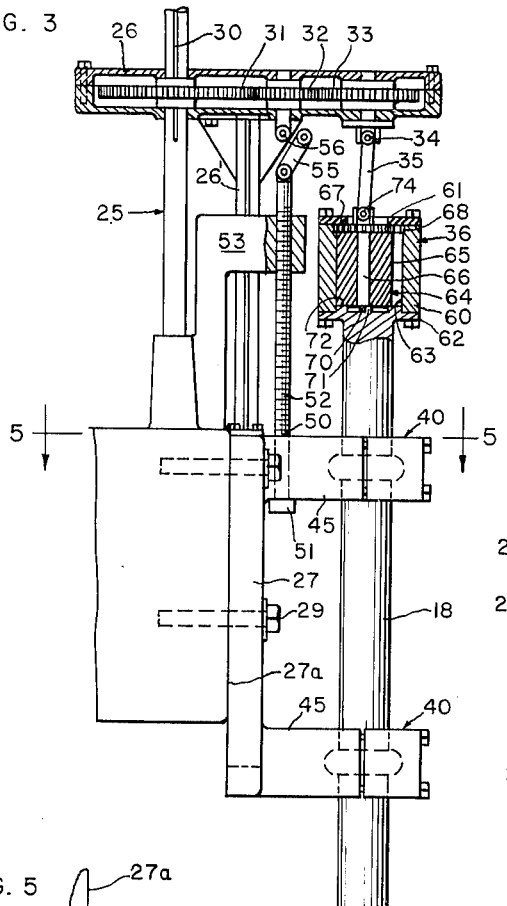
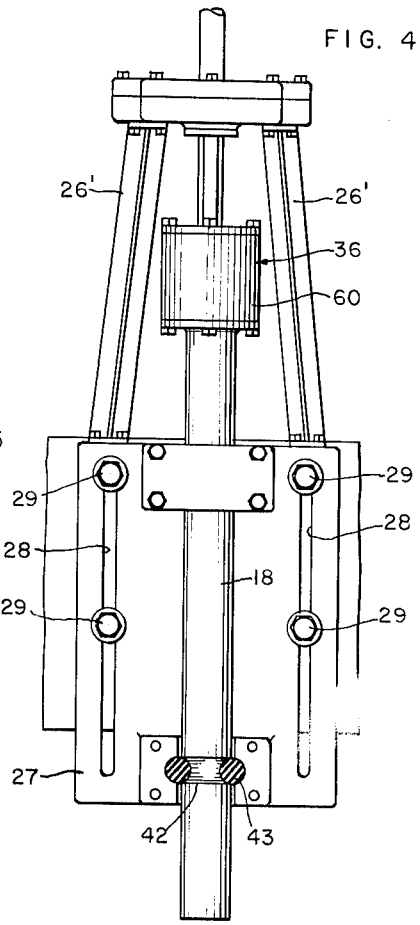
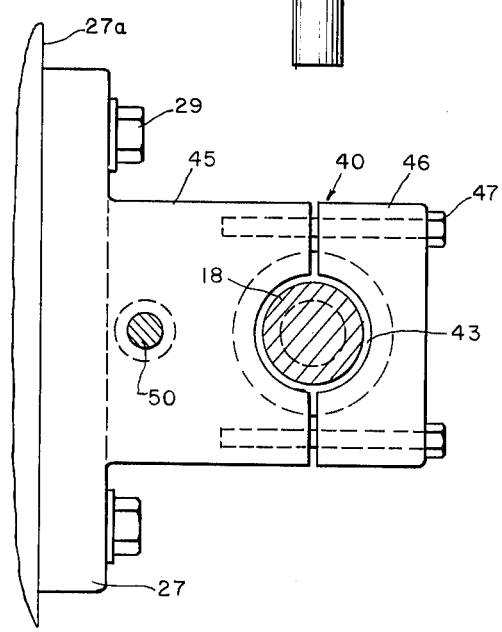
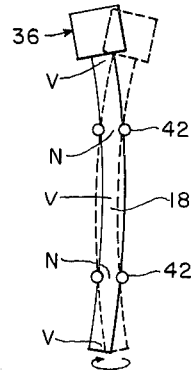
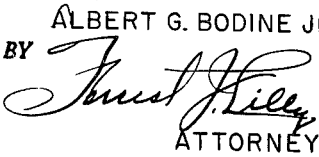

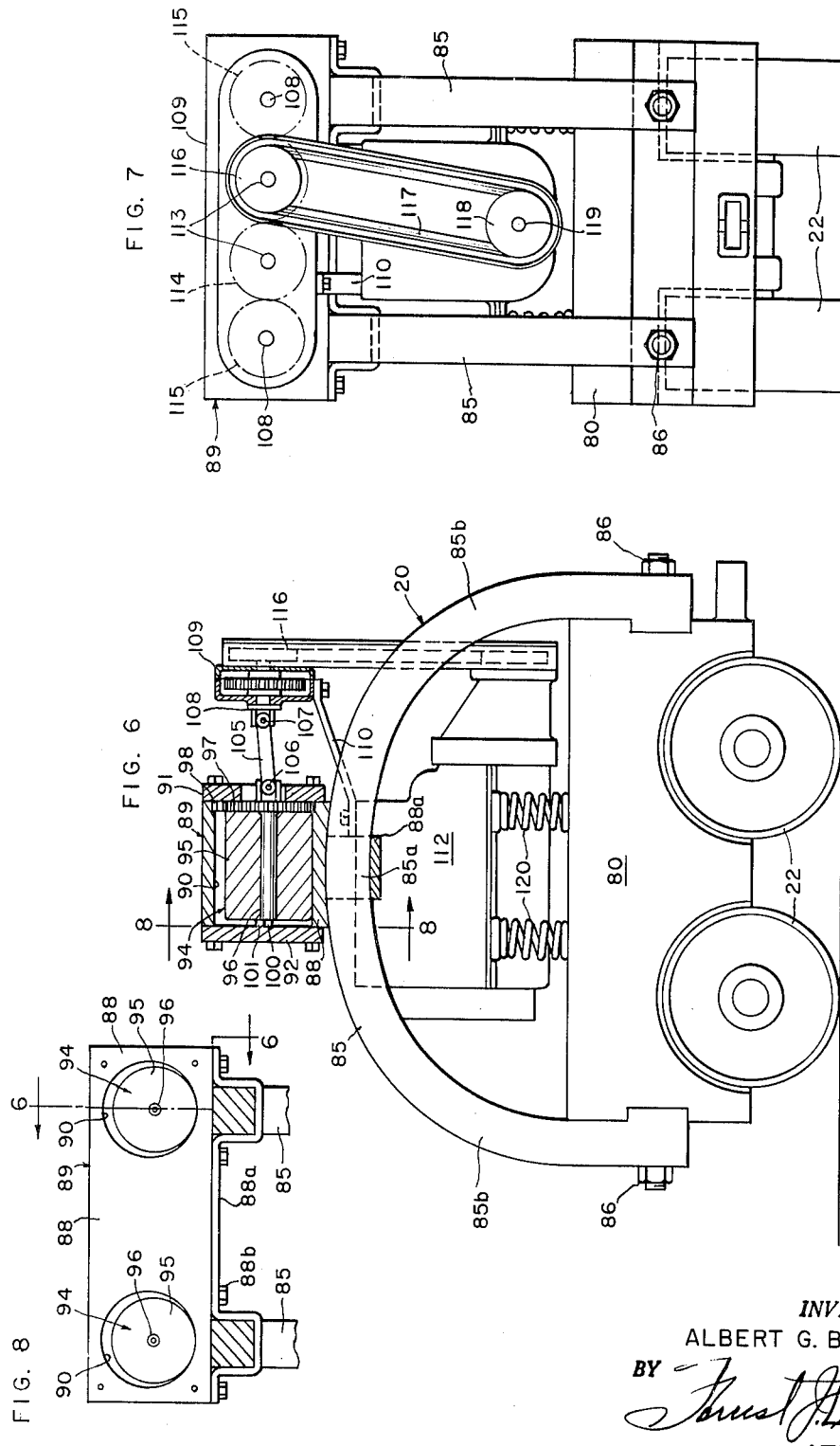

June 21, 1966 A. G. BODINE, JR 3,256,695
SONIC METHOD AND APPARATUS FOR FORMING TRENCHES AND
FOR LAYING PIPE LINES THEREIN
Filed Feb. 13, 1963 10 Sheets-Sheet 4
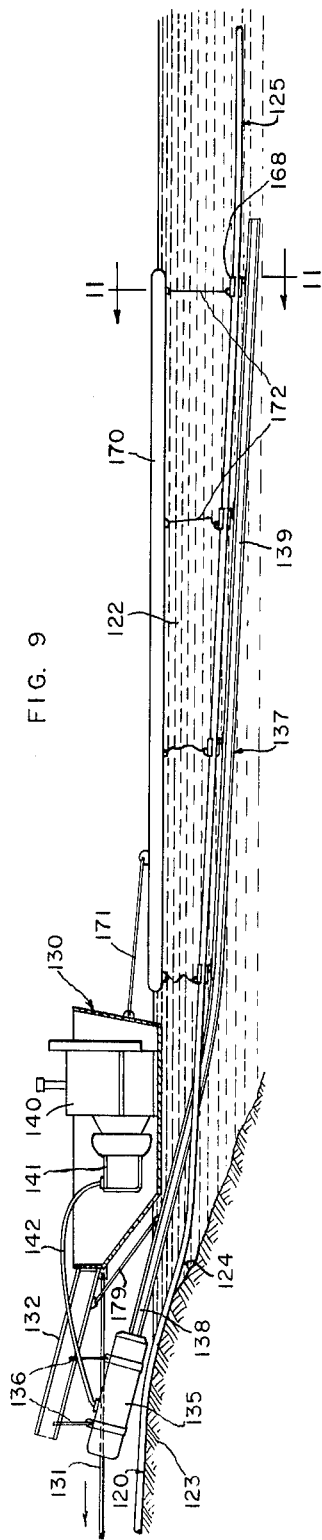
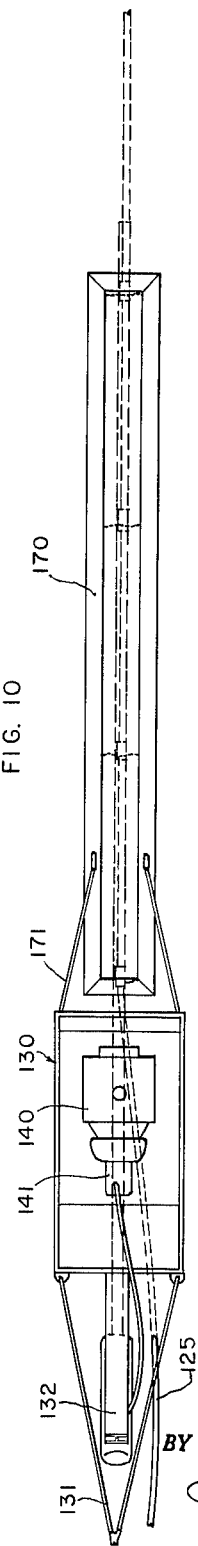
INVENTOR.
ALBERT G. BODINE JR.
BY
ATTORNEY

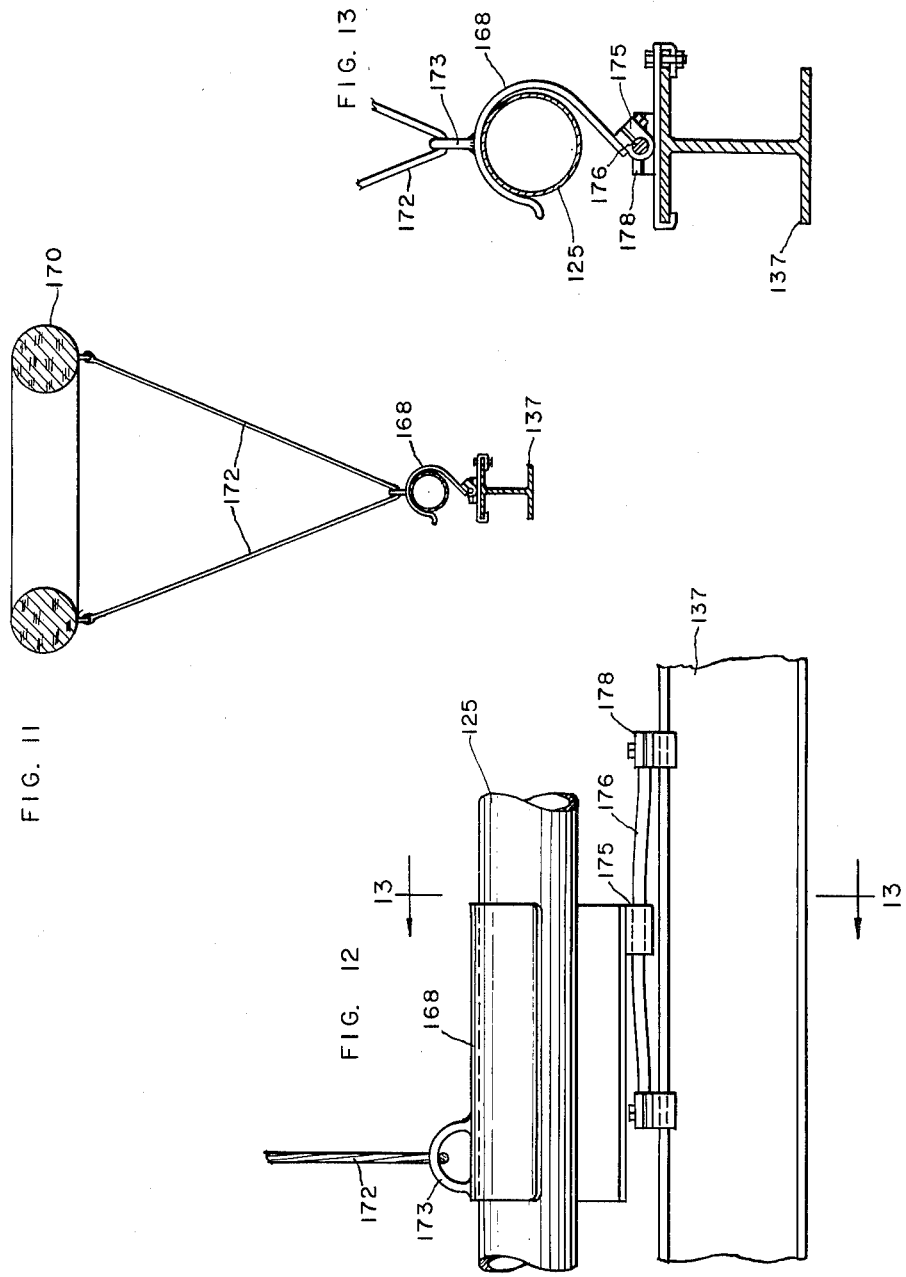

June 21, 1966 A. G. BODINE, JR 3,256,695
SONIC METHOD AND APPARATUS FOR FORMING TRENCHES AND
FOR LAYING PIPE LINES THEREIN
Filed Feb. 13, 1963 10 Sheets-Sheet 6
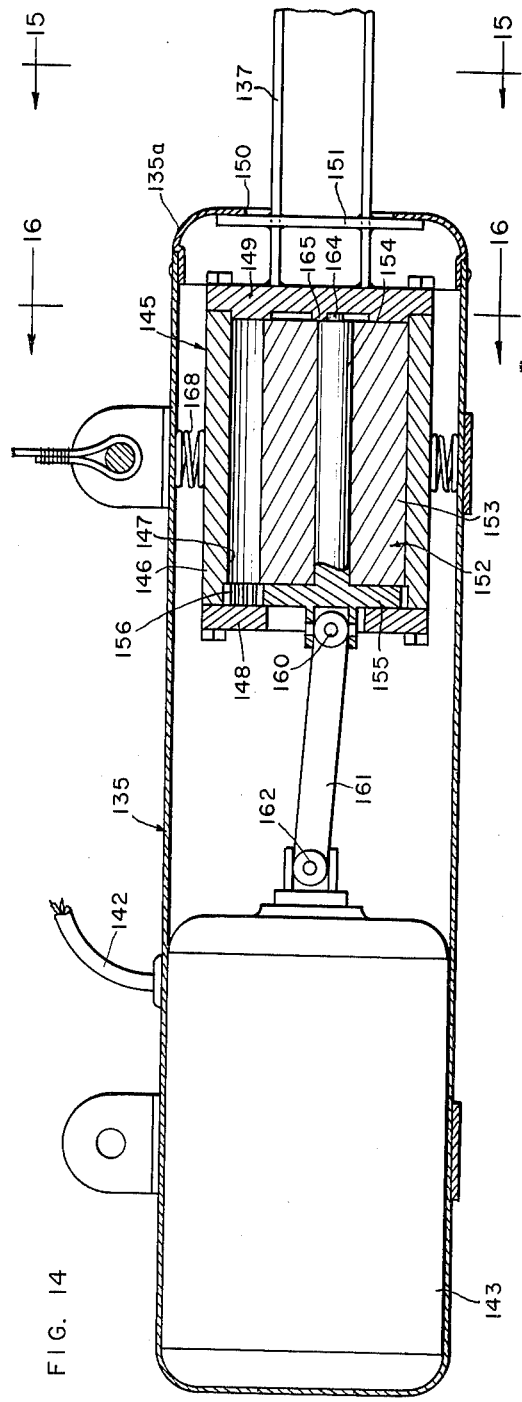
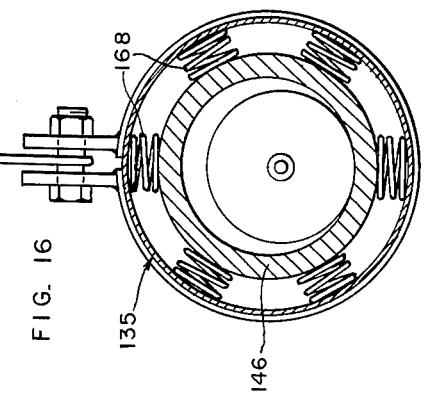
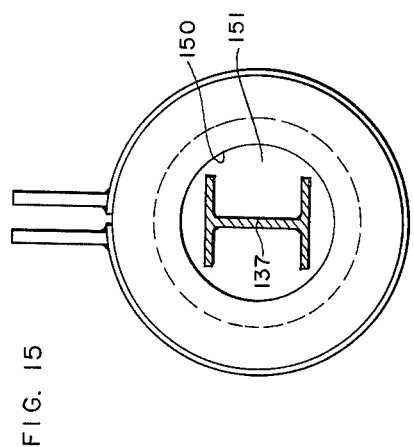
INVENTOR.
ALBERT G. BODINE JR.
BY
ATTORNEY

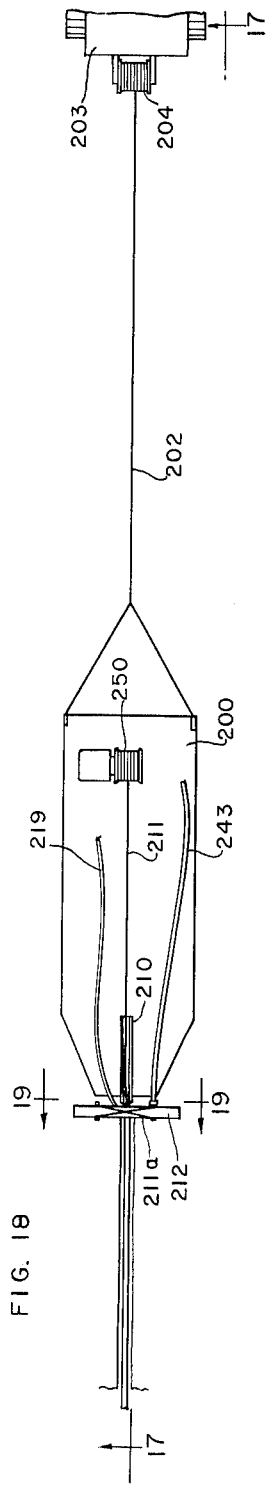
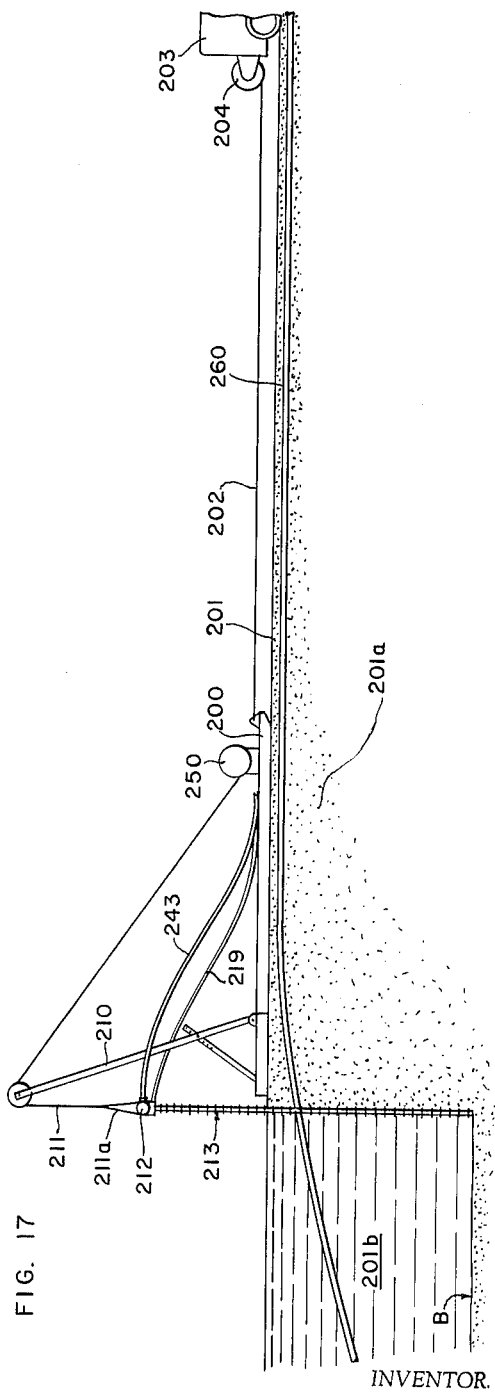
FIG. 18
FIG. 17
INVENTOR.
ALBERT G. BODINE JR.
BY
ATTORNEY

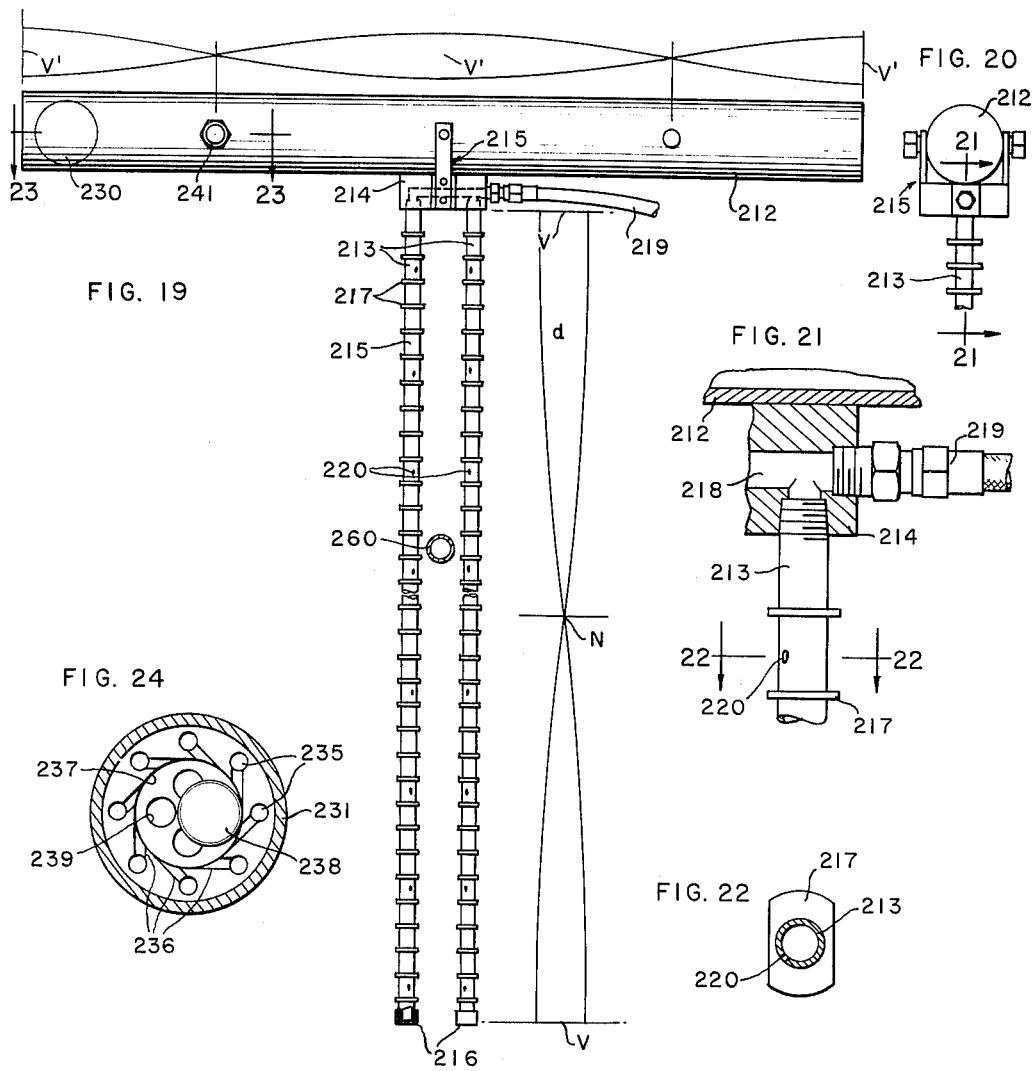
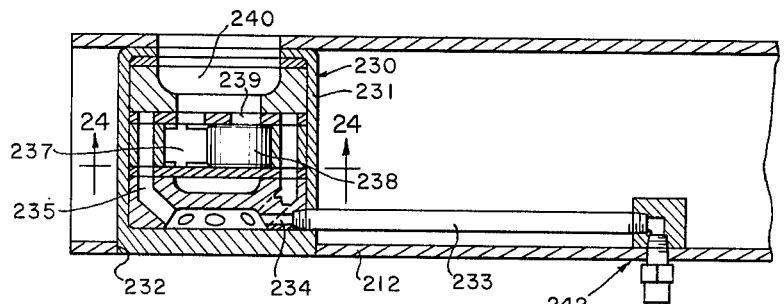

June 21, 1966  A. G. BODINE, JR  3,256,695
SONIC METHOD AND APPARATUS FOR FORMING TRENCHES AND
FOR LAYING PIPE LINES THEREIN
Filed Feb. 13, 1963  10 Sheets-Sheet 9

INVENTOR.
ALBERT G. BODINE JR.
BY
ATTORNEY

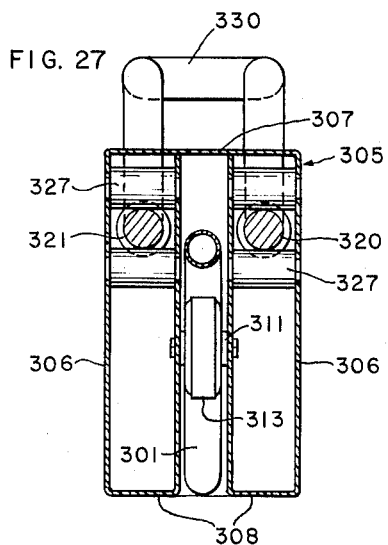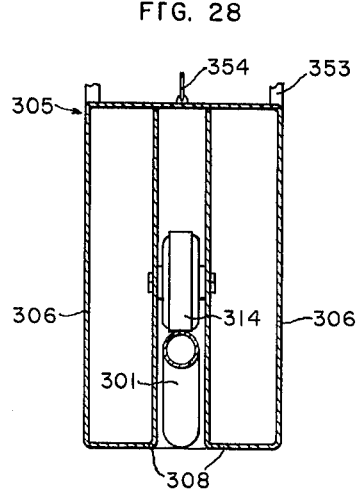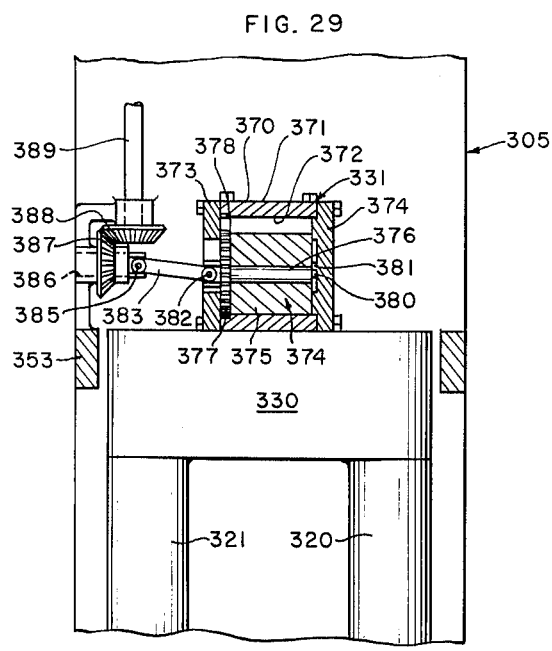

3,256,695
SONIC METHOD AND APPARATUS FOR FORMING TRENCHES AND FOR LAYING PIPE LINES THEREIN
Albert G. Bodine, Jr., 3300 Cahuenga Blvd., Los Angeles, Calif.
Filed Feb. 13, 1963, Ser. No. 258,216
20 Claims. (Cl. 61—72.6)

This invention relates generally to methods of and apparatus useful particularly for laying and burying long pipe lines in the earth, such as transmission pipe lines for water, gas or oil, utilizing a novel application of sonic wave principles to form a trench, or a trench-like region of what may be aptly described as sonically "fluidized" earth, into which the pipe line may sink. Sonic soil "fluidization," explained in more particular hereinafter, denotes a condition in which the individual particles of the soil are set into sonic vibration, and move relatively to other particles, so that the soil mass is rendered loose and mobile, and may in some cases run almost like water.

Objects of the invention include, broadly, the provision of methods and apparatus involving novel applications of sonic wave principles for forming a trench of temporarily fluidized earth, or even an open trench; and the provision of methods of and means for causing a pipe line to sink into or be lowered within such trench of temporarily fluidized earth, or open trench.

According to one illustrative practice of the invention, high energy sound waves, in a frequency range of the preferred order of hundreds of cycles per second, are utilized to fluidize the earthen material in which the pipe line is to be sunk throughout a trench or trench-like region underlying the pipe line, and the pipe line, resting on this fluidized material, sinks therein by gravity. Of course the pipe line in such case must be of greater density than the fluidized earth material. The fluidizing effect varies, as might be expected, with the nature of the soil. The effect is particularly noteworthy in soils, wet or dry, when an intensive sound wave action is engendered therein by use of a sound wave radiator, which may be a pipe line to be buried in the soil, or a separate member. In some cases, the fluidization is greatly promoted by the presence of water, and in others the process does not require water for suitable results. Under the influence of the sound wave, a sandy soil is agitated into a state wherein it moves or runs almost like a liquid, making way for an extraneous solid body, such as a pipe line, pressed into or against it, or just resting thereon under the force of gravity.

The process is applicable particularly to the laying of pipe lines in sedimentary earthen material, characterized by soil, sand or rock material of a granular nature, occurring within a wide range of particle size from finely divided clays to coarse sand or gravel. A granular makeup, rather than sedimentary origin, however, is of primary importance, and the process is applicable, not only to sedimentary deposits, but to glacial till material of granular nature, regardless of original origin, to decomposed granite, and, as stated, to soils of all varieties. In some cases, the granular material may initially be consolidated, but becomes unconsolidated under the influence of the sonic wave action, and therefore capable of sonic "fluidization."

Such granular materials tend often to be fairly stable when undisturbed, even when saturated with water. The water in the interstices of the material is of course held by capillary forces, so that it is not particularly mobile. The sonic wave action engendered in the material provides and maintains an acoustic field of vibratory sonic energy which causes the various granular particles to "rattle" relative to one another, especially if the frequency is as high as approximately the lower limit of the audible range. A frequency of the order of one hundred cycles per second has been found to be especially effective. In this action, each grain particle vibrates randomly with a fairly uniform distribution of vibratory energy in all three directions. Each grain thus vibrates with a somewhat spherical sonic vibration energy zone around itself, with the consequence that the vibratory particles acquire a mobility which might be compared to a bed of loose ball bearings. This phenomenon is easily produced and observable with, for example, a body of loose, dry sand, sand and gravel, or crushed rock. Quite evidently, static friction between the particles is very greatly reduced by the sonic activation; and it is easily observable that the particles become fluid or mobile during maintenance of the sonic vibration. With many earth materials, the presence of water greatly promotes the described phenomenon, and may do so in various ways, including such performances as reduction of static friction between grains, displacement of the soil immediately adjacent the vibrating sound radiator, and sonic cavitation.

A wide variety of granular earthen materials or structures, consolidated or unconsolidated, wet or dry, or with varying degrees of moisture, from very dry to water-saturated, and including sands and gravel, clays, decomposed granite, etc., can be fluidized within the broad meaning of that term as used herein. Certain dry granular materials, loose, dry sand, for example, can be sonically agitated, and maintained in a state of virtual dynamic suspension, wherein it will run almost like water, moving under the influence of gravity or making way readily for a solid body introduced into it. Soils of various compositions, in their undisturbed state, with naturally occurring moisture, are capable of being sonically agitated and fluidized throughout a longitudinally extended trench-like region to permit easy introduction or burying therein of a horizontal pipe line. In such cases, the soil moves readily to permit entry and gradual settlement of the pipe line when the pipe line is simply rested on the soil and the soil thereunder is undergoing sonic wave treatment.

The process of the broad invention can be carried out in a variety of ways. One illustrative practice involves application of sound wave action directly to the pipe line resting on or in the soil, so as to radiate sonic waves into the earthern material therearound. The resulting fluidization effect on the soil permits the pipe to sink or work down into it while the sonic wave action is maintained. Incidentally, the soil cannot be sonically fluidized first, and the pipe then laid over the formerly fluidized soil. Once the sonic wave action is terminated, the fluidization activity also comes to an end. While the soil may remain loosened for a short period, so that the pipe line might be more easily worked down into it, compaction soon occurs. The true sonic fluidization effect, however, lasts only while sonic wave radiation persists. A second illustrative practice involves the use of a separate powerful sound wave radiator which is acoustically coupled to the soil in the region of the pipe line, and which is worked along or through this soil so that the soil in this region is thus sonically fluidized, and the pipe line sinks therein. The second practice is preferred when the pipe line may be incapable of withstanding direct sonic vibration, as, to cite one actual example, in the case of a live cement-coated gas transmission line, and the problem is to bury it without taking it out of service. In still other cases, sonic wave action may be applied to the pipe line and also to a separate wave radiator. One method of carrying out this latter practice is to apply sonic wave action directly to a wave radiator acoustically coupled to the soil, and at the same time sufficiently close coupled through the soil to the pipe line at one point so as to engender sonic wave action or vibration in the latter, which may then radiate sonically into the soil at points substantially removed from the locus of the point of coupling of the soil to the pipe.

A modification of the broad process comprises the use of vertical sonic radiators of special form to form a pair of parallel grooves or narrow preliminary trenches at the two sides of the pipe line by sonic soil fluidization, and the use of water spray jets to wash away the fluidized soil, as well as to disintegrate and wash away any remaining supporting wall under the pipe and between the preliminarily made parallel trenches to form the final trench which is to receive the pipe line. This final step of disintegrating the wall under the pipe may be carried out by coupling a sound radiator thereto, or by simply washing away through hydraulic jetting. The resulting slurry may, if desired, be pumped away, leaving an open trench.

Several illustrative applications of the invention will now be disclosed in further detail, reference being had to the accompanying drawings, wherein:

FIG. 1 is a somewhat diagrammatic side elevational view of a form of apparatus in accordance with the invention, the underlying ground being illustrated in vertical section to show, in elevation, the pipe line that is being laid;

FIG. 2 is a plan view of the apparatus of FIG. 1;

FIG. 3 is an enlarged view of the front end portion of the tractor vehicle of FIG. 1, with parts in vertical medial section;

FIG. 4 is a front elevational view of the apparatus of FIG. 1, as viewed looking toward the left in FIG. 1;

FIG. 4a is a diagram illustrating the nature of the vibration of the vibratory part of the apparatus of FIGS. 1–5;

FIG. 5 is a detail section taken on line 5—5 of FIG. 3;

FIG. 6 is a side elevation of the second or towed vehicle of FIG. 1, the scale being to larger size, and portions being taken in vertical section;

FIG. 7 is a front elevational view of the vehicle of FIG. 6, looking toward the left as viewed in FIG. 6;

FIG. 8 is a section taken on line 8—8 of FIG. 6;

FIG. 9 is a side elevational view, largely in diagrammatic form, of another type of apparatus in accordance with the invention, the underlying soil in which the pipe line is being laid being shown in vertical section;

FIG. 10 is a plan view of the apparatus of FIG. 9;

FIG. 11 is a vertical transverse section taken on line 11—11 of FIG. 9;

FIG. 12 is an enlargement of a fragmentary portion of FIG. 9;

FIG. 13 is a section taken in accordance with line 13—13 of FIG. 12;

FIG. 14 is a longitudinal vertical section of the sonic wave generator shown in FIG. 9;

FIG. 15 is a section taken on line 15—15 of FIG. 14;

FIG. 16 is a section taken on line 16—16 of FIG. 14;

FIG. 17 is a longitudinal section view showing another embodiment of the invention in somewhat diagrammatic form, the section being taken through the mud or sand in accordance with line 17—17 of FIG. 18, with the apparatus of the invention appearing in side elevation;

FIG. 18 is a top plan view of the apparatus of FIG. 17;

FIG. 19 is a transverse section taken in accordance with line 19—19 of FIG. 18;

FIG. 20 is an end elevational view of the upper portion of the apparatus of FIG. 19;

FIG. 21 is a section on line 21—21 of FIG. 20;

FIG. 22 is a transverse section on line 22—22 of FIG. 21;

FIG. 23 is a section on line 23—23 of FIG. 19;

FIG. 24 is a detail section on line 24—24 of FIG. 23;

FIG. 25 is a plan view showing another embodiment of the invention;

FIG. 26 is a section taken on the broken line 26—26 of FIG. 25;

FIG. 27 is a transverse section taken on line 27—27 of FIG. 26;

FIG. 28 is a section taken on line 28—28 of FIG. 26; and

FIG. 29 is an enlargement of a portion of FIG. 25, with portions broken away to show in section.

With reference first to the embodiment of the invention shown in FIGS. 1 to 8, wherein the purpose is to lay a pipe line in normally compacted soil, dry or moist, numeral 10 designates generally a suitable conveyance, in this case a crawler-type tractor vehicle, equipped with conventional crawler tracks 11, and provided with a seat 12 for an operator, and with suitable controls, including steering wheel 13. The tracks 11 are relatively wide-spaced, so as to straddle nicely the trench to be formed and the pipe line to be laid in the latter. The tracks 11 are shown as riding on the surface of the ground 15 in which the trench is to be formed for reception of the pipe line, indicated generally by numeral 16.

Tractor vehicle 10 is shown equipped at its forward end with a vertically disposed elastic sound wave radiator bar or rod 18, in this instance of cylindrical form, for fluidization of the earth material throughout an area whose center moves with the vehicle along a line extending longitudinally of the vehicle and midway between the tracks thereof as the vehicle crawls forwardly. For some purposes, the bar 18 may be employed to break and fluidize the ground surface through a width and depth sufficient to form a pipe-receiving trench of the necessary dimensions without further aid. However, the apparatus of FIG. 1 contemplates the use of the sonically vibrating bar 18 to form the fluidized earth trench part way down, and utilizes a towed vehicle 20, also equipped with sound wave radiator means, but of a different type, for fluidizing the earth to a greater depth than that accomplished by the bar 18 alone. The pipe line 16 is thus lowered part way by the sound wave radiator carried by tractor vehicle 10, and to its full or final depth by the sound wave radiation from the towed vehicle 20. The two vehicles thus cooperate, the first to fluidize an upper layer of soil, and the second to deepen the trench and cause the pipe line to sink to greater depth than might be accomplished by the first vehicle operating alone.

Describing the second or towed vehicle 20 very briefly at this point, it is towed by a draw bar 21 from tractor vehicle 10, and it has four flat wide-tread wheels 22 which transmit vibratory forces generated within vehicle 20 to the ground surface, and thereby create powerful sonic (compresssional) waves, such as indicated at $w$ in FIG. 1, which are propagated downwardly in the earth, and which are of sufficient power and frequency as to create an effective fluidizing effect on the earth material such as will cause the pipe line, partially buried by the action of bar 18 of tractor vehicle 10, to sink a substantial distance deeper in the soil.

Returning to a more detailed consideration of tractor vehicle 10, a drive shaft 25 projects upwardly from its forward end, and this driveshaft 25 may be powered from an auxiliary engine, not shown, contained within vehicle 10. The engine which powers shaft 25 may be separate of the engine which powers the vehicle 10, and provided with suitable speed controls, or a governor, to permit or assure attainment of a resonant drive frequency for the vibratory bar 18 mentioned hereinabove. Alternatively, the shaft 25 may be a power take-off shaft from the main power engine, not shown, of the vehicle 10. In such case, since the speed of drive shaft 25 must ordinarily be controlled independently of the speed at which the vehicle engine drives the tracks 11, a suitable variable speed hydraulic transmission (not shown) may be interposed between the vehicle engine and the power take-off shaft 25. And in this case, means of a conventional nature may be provided whereby the shaft 25 is governed to drive at a pre-determined speed appropriate for the resonant vibration frequency required for vibratory bar 18.

Shaft 25 projects through a gear transmission housing 26, which is supported by arms 26' erected from a vertically disposed frame plate 27 mounted, with provision for vertical adjustment of its position, on the front end of the vehicle, against a vertical bearing surface 27a. As here shown, the plate 27 has a pair of vertical slots 28 (see FIG. 4) which pass a pair of headed clamp screws 29 threaded into the front end of the vehicle, and which normally support the frame plate 27 from the latter. By loosening the screws 29, the plate 27 and parts carried thereby, including the aforementioned vibratory bar 18, are freed for vertical movement; and means presently to be described are provided for moving the plate 27 and parts carried thereby between the working position illustrated in the drawings and an elevated carrying position wherein the lower end portion of bar 18 clears the ground surface.

Shaft 25 is formed with a spline 30, for splined connection with a gear 31 contained in housing 26, and said gear 31 meshes with a gear 32, which in turn meshes with a gear 33 whose vertical axis is aligned with the longitudinal axis of the aforementioned cylindrical bar 18. Gear 33 has a universal joint connection at 34 with a conically gyratory shaft 35, which drives a vibration generator generally indicated by numeral 36 mounted on and acoustically coupled to the upper extremity of the bar 18.

The bar 18 comprises, in this instance, a relatively heavy cylindrical steel shaft, supported at points one quarter of its length from each of its ends by a clamping means 40 mounted on and projecting outwardly from the aforementioned frame plate 27. The bar or shaft 18 is preferably not clamped metal-to-metal by the clamps 40. It is instead formed with rounded grooves 42 which receive resilient rubber O-rings 43 mounted within clamp 40, in the fashion clearly illustrated in FIGS. 3, 4 and 5. The bar 18 is shown in working position in FIGS. 1, 3 and 4, with nearly its lower quarter buried below ground level, so as to form an acoustic coupling and radiator element having an area extended in two dimensions in an intimate face-to-face acoustic coupling engagement with the soil.

Each clamp 40 will be seen to comprise a bracket 45 secured directly to plate 27, and a clamp block 46 secured to bracket 45 by means of screws 47, the outer end of bracket 45 and the inner face of block 46 being formed to accommodate the bar 18 and the O-rings 43. These O-ring mountings avoid damping of the vibratory bar 18.

The upper of the brackets 45 is bored to pass a rotatable shaft 50, which has a lower unthreaded extent within the bracket 45, and a head 51 at its lower extremity engaging the underside of said upper bracket 45. Shaft 50 has a threaded portion 52 which is screwthreaded in a bracket 53 mounted on the vehicle. When the screws 29 are loosened, the brackets 45, the plate 27 and the bar 18 all hang from this shaft 50. Rotation of shaft 50 at this time, because of the screwthreaded connection with bracket 53, results in elevation of the assembly hung from the shaft 50, and to accomplish this purpose, I furnish the upper end of the shaft 52 with a pivotally connected link 55, capable of being pin-coupled to a shaft 56 projecting downwardly from gear 32. For this purpose, the lower extremity of shaft 56 and the upper end of pivoted link 55 are perforated, as shown, to receive a temporary inserted coupling pin, not shown. Rotation of shaft 25 by its power means within the vehicle will then rotate the shaft 50 through gears 31 and 32 and the normally disconnected but now coupled link 55, so that shaft 50 will move upwardly in bracket 53, whereby the assembly comprised of brackets 45, plate 27, the vibratory bar 18, as well as arms 26' and the gear housing 26 are all hoisted to elevate bar 18 to above ground level. Screws 29 may at this time be again tightened, and the apparatus transported along a roadway. To lower the hoisted assembly into working position, either to lower bar 18 into an existing trench, or, with the bar vibrating, to work it down into the soil in the first instance, the plate 27 is again freed for movement, and shaft 50 turned in the reverse direction. This may be accomplished with engine power by shifting a reverse gear box, not here shown, but which may be located at any convenient place in the drive train, for example, between drive shaft 25 and its engine, or more simply, between link 55 and gear shaft 56, attached to the underside of housing 26. It is also feasible to use such means for slowly vertically reciprocating the vibratory bar 18 during operation, the screws 29 being set to act as guides instead of tightened to clamp the plate 27 firmly in position.

The sonic vibration generator 36 is shown diagrammatically. It is of a general type first disclosed in my prior application entitled Vibration Generator for Resonant Loads and Sonic Systems Embodying Same, Serial No. 131,385, filed March 21, 1962. For additional details, said application should be consulted. It might be incidentally mentioned, however, that while the vibration generator of said prior application embodies twin oppositely turning inertia rotors, which produce components of vibration in one direction which are additive, and components in a direction at right angles to the first mentioned direction which cancel one another, the present generator, as here illustrated, involves only a single rotor, and produces vibration of a gyratory type, as later explained.

As here shown, the generator 36 has an exterior housing embodying a cylindrically bored body 60 and upper and lower end plates 61 and 62, the latter, in this instance, being formed conveniently as an integral flange on the upper extremity of bar or shaft 18. The bore in the body 60 is designated by numeral 63 and is vertically disposed and forms a raceway for a cylindrical orbital inertia rotor, of somewhat smaller diameter, generally designated by numeral 64. The rotor 64 embodies a cylindrical inertia roller 65, of somewhat lesser diameter than that of raceway bore 63, as illustrated in FIG. 3, for example, and which is rotatably mounted on an axle 66 projecting axially from the hub portion of a spur gear 67. The pitch circle of this spur gear 67 is of substantially the same diameter as the roller 65. Gear 67 meshes with an internal gear 68 located within housing body 60 concentrically with the corresponding raceway bore 63, and whose pitch circle is substantially of the same diameter as said bore.

The rotor 64 is designed to move in an orbital path about its raceway bore 63 as a guide, bearing against the surface of said bore by centrifugal force. In this motion, gear 64 runs in mesh with internal gear 68. To maintain the roller 65 in proper engagement with the raceway 63 while the generator is at rest, or coming up to speed, the axle 66 of the rotor is provided with an axial pin 70 which rides around and is guided by a circular boss 71 projecting upwardly from the upper extremity of bar 18 coaxially with raceway bore 63. As somewhat diagrammatically here shown, the rotor 65 rides at its lower end on a bearing face 72 formed on the upper extremity of the bar 18. It will of course be evident that a more sophisticated bearing for the roller 65 will preferably be provided in practice, this being within the skill of the art.

The rotor 64 is driven through a universal joint coupling 74 connected between the aforementioned conically gyratory shaft 35 and the hub of spur gear 67.

Operation of the generator is as follows: rotation of shaft 35 produced through gears 31, 32 and 33 from driveshaft 25 causes spur gear 67 to roll around internal gear 64, the shaft 35 moving in a conical gyratory fashion. The inertia roller 65 rolls on the bearing surface afforded by bore 63, so that the rotor 64 moves in an orbital path. The centrifugal force developed by the rotor moving in this orbital path results in exertion of a rotating force on the body member 60, the force vector rotating about the axis of the raceway 63. The roller 65 turns at nearly the same rate of rotation as the gear 67, with any slight variation or creep therebetween accommodated by the rotatable mounting of the roller on shaft 66. Thus a gyratory force is exerted on the body 60, and this gyratory force is transmitted to and exerted on the upper extremity of the elastic steel shaft or bar 18. Assuming this gyratory force to occur at a cyclic frequency which is equal to or approximately that of the resonance frequency for a lateral mode of standing wave vibration in the bar 18, a gyratory standing wave is thereby set up in said bar. The bar 18 does not rotate bodily, but portions thereof spaced from the nodal point or points of the gyratory standing wave gyrate in a circular path by corresponding elastic bending of portions of the bar from its neutral position, as shown with exaggeration in FIG. 4a. Referring to FIG. 4a, the nodal points are at N, spaced one quarter of the length of the bar from each of its ends, these being the points where the bar is supported by the the rubber O-rings 42. A velocity antinode V occurs at the mid-point of the bar and at each of its ends. The gyratory standing wave thus obtained is a form of harmonic lateral or transverse vibration, being, specifically, the resultant of two components of linear transverse harmonic vibration occurring at right angles to one another at 90° phase difference. This resultant gyratory vibration is propagated longitudinally along the bar at the speed of travel of transverse elastic waves. FIG. 4a indicates the motion characteristic of a gyratory standing wave for the fundamental resonant frequency of the bar for longitudinally propagated transverse elastic waves. It will be understood from known principles that the standing wave diagrammatically indicated results from the transmission down the tube from the generator 36, of transversely oriented elastic deformation waves, which are reflected from the far end of the bar, and through interference with a succeeding forwardly propagated wave, the standing wave is established as indicated. The lower quarter wavelength portion of the bar, from the lower node N to the lower antinode V, thus undergoing cyclic elastic deformation in the motion pattern as described and illustrated, and with its extended area in face-to-face contact with the soil, is an effective implement acoustic coupling and radiator for transmitting sonic wave energy to and through the soil such as will accomplish a soil fluidization effect as mentioned hereinabove. In this connection, it should be understood that for acoustic coupling to granular soil material, the coupling element must be one having an extended area-type contact with the soil, rather than merely a point or line contact, as with an edge or blade, as in the case of certain rock or mineral cutting machines of the prior art.

Thus, assume the bar 18 to be lowered by proper adjustment of frame 27, to the working position of FIG. 1, and power plant for drive shaft 25 to be operated at the proper speed to drive sonic vibration generator 36 at the fundamental resonant frequency for full wavelength lateral vibration of the bar 18. The bar 18 is caused to undergo the standing wave action diagrammed in FIG. 1, moving somewhat as illustrated, but with considerable exaggeration, in FIG. 4a.

At the start, a few feet of open trench may be dug by ordinary procedures, and the beginning end portion of the pipe line laid therein. This preliminary trench is preferably sloped gradually upwardly at one end, so that the pipe will not have to undergo too sharp a bend. Thus, the pipe line may be placed somewhat in the position shown in FIG. 1, where a portion thereof, several feet below ground, merges with a sloping portion which in turn merges with the pipe portion resting on the ground surface. It is understood that in this preliminary stage, the pipe line, though in the configuration of FIG. 1, is actually resting on the bottom of a preliminarily dug open trench, not illustrated. The crawler vehicle is then manipulated so as to straddle this preliminary trench and the beginning end portion of the pipe line, and the gyratory bar 18 is lowered to the working position of FIG. 1, where its lower extremity will be seen to clear the pipe.

The crawler vehicle is then driven forward, and the bar 18, which is in firm, pressural contact with the soil, is sonically gyrated, and radiates a soil fluidizing sound wave into the soil thereabout. The gyratory sonic wave propagated in the soil is represented in FIG. 1 by the spaced lines g, and the boundary surface within which the soil is to be effectively fluidized by this wave action is represented by the dashed line s. To fluidize the volume of soil within this boundary surface requires a proper amount of sonic power, and a sonic wave generator of proper output impedance for a highly resistive load. Soil constitutes a highly resistive or power consuming load, as contrasted with a more reactive load such as solid rock, concrete, or the like. The soil impedance is thus highly resistive, and to cope with this resistance, the sonic oscillator must have a relatively large force output in relation to the inertia of its housing and associated resonant structure such as the elastic bar. In this way the oscillator can accept substantial rotary power from its drive, and deliver substantial acoustic power to the earthen material. This impedance feature, incidentally, is to be understood as incorporated in each of the subsequently described embodiments of the invention. Sonic power can be regulated by means of the throttle of the diesel engine driving the sonic generator. Opening of the throttle results in increased power delivery, without material increase in engine speed, or in frequency of gyratory vibration of the generator 36, because the system tends to "lock in" within a resonant frequency range, i.e., for a limited frequency band including peak resonance. In other words, the resonant vibratory system "holds back" on the engine as regards increased speed, but accepts increased power. The effect of this increased engine power delivery to the vibratory system output, within easily controllable throttle limits, is thus increased vibration amplitude, rather than linear increase in engine speed and sonic vibration frequency. The operator may thus easily regulate the vibration amplitude, and therefore the power delivery to the soil, in accordance with particular soil conditions encountered to obtain the necessary soil fluidization effect within the necessary boundary area. It is important to note that the wave pattern shown for the elastically vibratory bar in FIG. 4a is in effect one full wave length. With this system it is also possible to operate the bar at an overtone, such as one and one-half wave lengths. This latter means the bar can be half again as long as shown, so as to accomplish deep penetration and correspondingly deep sonic wave effect in the earth. The bar could thus operate along side of the pipe, or it could sink deep pipes.

The pipe portion intersecting the fluidized volume of earth sinks therein under the influence of gravity, with certain constraint owing to stress in the pipe line ahead still resting on the ground surface, as well as with certain aid owing to stress in the already lowered portion of pipe behind. This sinking of the pipe through the fluidized soil proceeds continuously as the vehicle 10 moves the bar 18 forward, the sonically gyrating bar working its way forward through this fluidized soil, all so as always to maintain the approximate relationships represented in FIG. 1. Thus, the pipe portion at 16a, well ahead of the fluidized soil, rests on the ground surface. At region 16b, the pipe bends gently downward, the underlying soil giving way to the necessary extent owing to the more complete fluidization effect within the boundary s, wherein the support of the local pipe portion 16c by the soil is very greatly disturbed, and the pipe drops accordingly. The soil remains in a somewhat fluidized, stirred up or unsettled condition for a short period of time following the sonic activation, and so the pipe line may continue to settle to some extent behind the boundary surface s. Thus, the pipe in region 16d, behind the soil volume under sonic activation inside boundary s, settles some distance further. The pipe thus may continue to settle, by itself, to the final level, at 16d.

In some cases, or with some soils, the final settlement to the low final level at 16d may require additional help, and to this end, I provide the second sonic radiator vehicle 20.

The vehicle 20, towed by the tractor vehicle 10, includes a heavy body 80 mounted directly on the axles of wheels 22. A pair of large bow-springs 85 are provided in planes parallel to and spaced from one another and extending longitudinally of the vehicle. These large bow-springs are firmly secured, by means indicated at 86, to the front and rearward ends of vehicle body 80, and bow upwardly from these points of securement as indicated clearly in FIG. 6.

Bridging across and mounted atop these bow-springs 85 is the body 88 of a sonic vibration generator designated generally by the numeral 89. This generator is similar in many respects to the previously described generator 36, and is also of a type disclosed and described more particularly in my aforementioned application Serial No. 131,385. The body member 88 is mounted on the springs by means of strap 88a and screws 88b (FIG. 8). The generator body 88 has parallel bores 90 extending therethrough from front to rear, and the body 88 together with front and rear end plates 91 and 92 form a generator housing.

Contained in each of bores 90 is an inertia rotor 94, made up of a cylindrical roller 95, of somewhat lesser diameter than that of the bore 90, rotatably mounted on a shaft 96 that projects axially from a spur gear 97 whose pitch circle is of a diameter equal to that of the roller 95, and which meshes with an internal gear 98 formed inside bore 90, with a pitch circle equal to that of said bore 90.

Each rotor 94 is designed to turn in an orbital path about its corresponding bore 90, which forms a raceway therefor, with each gear 97 always in mesh with the corresponding internal gear 98, and with the inertia roller 95 rolling on the bearing surfaces afforded by the raceway bore. To maintain the roller 95 in proper engagement with the raceway surface while the generator is at rest, or coming up to speed, the axle 96 of each rotor is provided with an axial pin 100 which rides around a circular boss 101 projecting inwardly from sidewall 92 on the axis of the corresponding raceway bore.

The two generator rotors 94 are driven through a pair of conically gyratory driveshafts 105, only one of which is seen in the drawings, FIG. 6, each of which has a universal joint coupling 106 to the corresponding spur gear 97. The shafts 105 are connected through universal joint couplings 107 with gear shafts 108 journalled in the gear housing 109 on axes which are aligned with the center axes of the raceway bores 90. The gear housing 109, which is here shown as supported by a bracket arm 110 extending from a presently mentioned diesel engine 112 utilized for the drive of the vibration generator, journals also a pair of shafts 113 carrying gears 114 which mesh with one another and also with gears 115 on the shaft 108, forming a gear train as clearly indicated in FIG. 7. One of the shafts 113 carries also a pulley 116 connected by belt 117 with drive pulley 118 on the drive shaft 119 of engine 112. Engine 112 is mounted through heavy coil springs 120 on vehicle body 80, and these springs 120 will be understood to be designed for isolation of the engine 112 and the gear housing 109 supported thereby from the vibration imparted, as later described, to the vehicle body 80.

Operation of the vibration generator is as follows: Rotation of shafts 105, which turn in opposite directions, rolls the two spur gears 97 around the internal gears 98, the two shafts 105 each moving in a conical gyratory fashion. The inertia rollers 95 roll on the surfaces of the cylindrical bore raceways 90, so that the rotors 94 move in orbital paths. The centrifugal force developed by the rotors moving in these orbital paths is taken by the surfaces of the raceways 90 in the generator body 88. The rollers 95 turn at nearly the same rate of rotation as the gears 97, but with some slight variation or creep therebetween, which is accommodated by the rotatable mounting of the rollers 95 on the shafts 96. The rotors 94, however, are phased so that the horizontal components of their motions will always be equal and opposed, while the vertical components thereof will be in phase or in step with one another, and this is accomplished in the original setting of the rotors by means of the interconnecting gear train. For example, as shown in FIG. 8, the two rotors may be set so that both are at their extreme lowermost positions simultaneously with one another. Accordingly, the rotors move up and down simultaneously and in step with one another and move horizontally with equal but opposed movements. The vertical components of the forces exerted on the body 88 are equal, in phase, and additive. On the other hand, the horizontal components of the forces exerted by the two rotors on the body 88 are equal, in phase, and in opposition, so as to continuously cancel. A vertically oriented alternating force is accordingly exerted on the generator body 88, and therefore on the mid-portion of the bow-springs 85.

The described vertical alternating force application to the mid-portions of the bow-springs 85 causes them to elastically flex and vibrate. The upper, mid-portions 85a of the springs 85 vibrate vertically, and portions 85b of these springs flex inward and outward in step with the upward and downward movements of the mid-portions 85a. The lower end extremities of the springs exert corresponding vertical components of alternating or shaking force on the vehicle body 80, causing the vehicle wheels, which are inherently acoustically coupled to the soil, to radiate the compressional sound waves w into the soil. These waves are made powerful enough, under control of the throttle of engine 112, to effect the degree of fluidization necessary in the region of the pipe portions 16d and 16e to accomplish the further or final settlement of the pipe that may be desired in any case.

FIGS. 9–16 show a modified form of the invention, designed in this case specifically for the practical problem of sinking of a pipe line in tide-swept mud flats, but capable of applications in various environments. In FIG. 9, numeral 120 represents tide-swept mud flats, the mud material in this case being assumed to be glacial till of a moist, sandy nature. It may be referred to as sand. A pipe line is represented generally at 125, the sonically fluidized porton of the sand being indicated at 122, separated from the not yet fluidized sand region 123 by a boundary 124. The pipe line is shown in FIG. 9 in course of a lowering operation in accordance with the present invention.

Numeral 130 designates generally a conveyance or vehicle, which may be a flat bottomed barge, or sledge, constructed appropriately for the nature of the earthen material, and the amount of moisture present, shown as riding on the mud flats, and which may be dragged thereover by means of a suitable towing vehicle, not shown, and a tow line 131. It must be understood that the barge or sledge rides on the sand in the fluidized region thereof and must, in effect, "float" on the fluidized sand. Projecting from the front of the vehicle 130 is a boom 132, from which is suspended, forwardly of the vehicle, a sonic vibration generator casing 135, suitable links or cable 136 being used for this purpose. The later described vibration generator contained within casing 135 is acoustically coupled to one end of a long and somewhat flexible, elastically vibratory steel beam 137, and which extends from generator 135 angularly down and under the barge at 138, and then trails rearwardly for a substantial distance at a lesser angle with horizontal, as at 139. This rearwardly extended beam portion 139 may be at just a few degrees below horizontal, or may be substantially horizontal. The beam 137 may conveniently have a conventional H-section. Vehicle 130 contains an internal combustion engine 140 driving an electric generator 141, and the generator 141 has a power cable 142 furnishing electric power to an electric drive motor 143 for the sonic vibration generator 145 contained within casing 135 (FIGS. 14–16).

Generator casing 135 is generally cylindrical, and mounts in one end thereof the electric drive motor 143. In the opposite end portion of the generator casing is the sonic vibration generator proper, generally designated by the numeral 145, and which is of the same general type as the generator 36 (FIGS. 3 and 4) described earlier. Thus, generator 145 has a cylindrical housing body 146 formed with a cylindric raceway 147, both oriented with the longitudinal axis thereof extending longitudinally of casing 135 and co-axially with reference to electric motor 143. Housing 146 has end plates 148 and 149, and to the latter is sonically coupled as by welding directly thereto, the corresponding extremity of vibratory H-beam 137 referred to hereinabove. As shown, generator housing 135 has an end member 135a formed with an opening 150 which clears the extremity of beam 137, and a plate 151 welded onto the end portion of the beam 137 closes this opening. It will be understood that the plate 151 vibrates with the beam 137 and with reference to the housing end wall 135a.

Mounted within vibration generator bore or raceway 147 is inertia rotor 152 comprised of cylindrical inertia roller 153, of somewhat lesser diameter than that of the bore 147, and which is rotatably mounted on a shaft or axle 154 co-axial and integral with a spur gear 155 whose pitch circle has a diameter equal to the diameter of the roller 153. This spur gear 155 meshes with an internal gear 156 formed inside housing 146 at one end of bore 147, with a pitch circle of diameter equal to that of the bore 147. Gear 155 has a co-axial universal joint coupling 160 to a conically gyratory shaft 161 having, at the opposite end thereof, a universal joint coupling 162 to the drive shaft of electric motor 143.

For guidance purposes, the extremity of shaft 154 opposite from gear 155 is formed with a co-axial boss 164 which rides around a circular boss 165 projecting from end plate 149 co-axially with raceway bore 147. These interengaging bosses aid in maintaining the proper position of the inertia rotor while the rotor is being brought up to speed, after which centrifugal force causes the surface of roller 153 to bear with considerable pressure on the surface of the raceway 147.

The operation of the vibration generator 145 is the same as that of those heretofore described, it being noted that generator 145 comprises a single inertia rotor, in common with the generator 36 of FIG. 1. A gyratory force is exerted on the generator housing comprised of the walls 146, 148, and 149, causing said housing to gyrate correspondingly, yieldingly resisted by the elastic steel beam 137 welded to one end thereof, as well as by the coil centering springs indicated at 168. It will be understood that this gyratory action is characterized, not by the rotation of the housing 145, but by motion of any given point on said housing through a circular path of small diameter. This same gyratory action is imposed on or transmitted to the extremity of the steel H-beam 137, and a gyratory wave is thence propagated along the length of the beam 137 at the speed of propagation of laterally oriented elastic waves in the material of the beam. As described in connection with an earlier embodiment of the invention, this gyratory type of action is, in effect, the resultant of two elastic waves occurring at right angles to one another, both transversely of the common longitudinal axis of the beam 137 and the generator 145, but occurring with 90° phase difference between them. The wave action in the beam 137 is thus analyzed as the resultant of two lateral waves propagated longitudinally thereof, with 90° phase difference therebetween. By use of this mode of transverse or lateral vibration, considerable increase in sonic energy can be transmitted along the beam, and therefore radiated therefrom.

The rotor 152 of the sonic wave generator is driven by electric drive motor 143 at a frequency to produce a lateral wave in beam 137 whose wavelength is divisable into the beam length a number of times equal approximately to a whole integer, and which may typically be in the range of six or eight, though without limitation thereto. Thereby, a condition of gyratory, resonant, standing wave vibration is established along the beam, affording good vibratory action in the beam, and good sonic wave radiation from the beam into the surrounding earth material.

In the illustrative embodiment under consideration, the vibratory beam 137 is suspended from and directly below the pipe line by sliding hook members 168 engaging around and slidable along the pipe line, and means are also provided by which the beam is maintained at or above a pre-determined depth in the sand. This means comprises, in the simple illustrative case, a float 170, made up of a long and narrow rectangular frame of buoyant material capable of "floating" on the fluidized mud or sand. The float 170 is towed by lines 171 from barge 130, and equipped with drop lines 172 passing through links 173 on the tops of the hook members 168 (FIGS. 9 and 11–13).

The hook members 168 are clamped, at the bottom, as at 175, to rods 176 connected at their ends by fixtures 178 to the upper flange of the H-beam.

A point on the forward end portion of beam 137 is also supported by means of a line 179 from the boom 132.

FIG. 9 shows the portion of the pipe line 125 toward the right as having been completely lowered to the desired final depth, the central region thereof undergoing lowering to this depth, with the extreme left hand portion of the pipe at its original elevation. It has already been described how the elongated beam 137 is set into resonant sonic wave vibration, preferably of a gyratory mode. Thereby, sonic waves are radiated into the mud or sand in contact with the beam, and a region of the mud or sand about the beam is sonically fluidized, according to principles heretofore explained. The fluidized region tends to limit itself at a fairly well demarked boundary, such as the boundary indicated at 124 in FIG. 9. The location of this boundary depends upon many variables, including the sonic power output, and the nature of the particular earth material encountered. When, however, a boundary tends to form, it acts as a sonic wave reflection region, thereby tending to confine the sonic wave transmission region inside this boundary. Thereby, an intensely sonically agitated region is developed around the wave radiator, in this case the beam 137; and while sonic wave transmission may occur to some extent outside the boundary region, the fluidization phenomenon is largely confined within the boundary region.

Under this fluidization effect so accomplished, the pipe line 120 readily sinks, as illustrated. The sinking of the pipe line may be promoted by the weight of the vibratory beam 137 being suspended therefrom. In the particular condition represented in FIG. 9, the final drop line 172 is shown to be taut, so that the beam is supported at one end by the wave generator assembly and the line 179, and at the other by this final drop line 172. On the way down to the position illustrated, however, the pipe is pulled down by the weight of the beam 137 hung from it. As the vehicle progresses forwardly, and the last hook member 168 slides forwardly on the pipe line, the weight of the rearward portion of the beam is transferred forwardly along the pipe line, and thus cooperates in pulling the pipe line down to the final level desired. Also, as the vehicle 130 progresses forwardly, the sonically vibratory beam 137 works its way forwardly in the fluidizing soil or sand; and it will be appreciated that the vibratory bar 137 thus produces a trench-like region of fluidized earth material into which the pipe line can progressively settle.

Two practices of the invention, illustrated in FIGS. 9–16, must be mentioned, the first being useful for pipe lines which for some reason, such as by reason of having a cement coating, will not withstand substantial vibration, and the second being useful for pipe lines well able to withstand powerful vibration.

For the first case, the rods 176 which connect the beam 137 with the pipe hook members 168 are fabricated as spring rods, with sufficient flexibility to permit vibration of the beam 137 without this vibration being transmitted to the pipe. In other words, the rods 176 are made to act as spring isolators. As a further measure for avoiding transmission of beam vibration to the pipe, the hook members 168 may be clamped to the beam 137 at nodes of the resonant standing wave in the beam.

The second case contemplates large transmission of vibration from the beam to the pipe. To this end, the rods 176 are made stiff and relatively inflexible, so that the vibration in the beam will not be isolated from the pipe line by these rods. Additionally, the hook members 168 may in this case be connected to the beam 137 at antinodes of the resonant standing wave in the beam. Vibration is thereby transmitted effectively from the beam to the pipe, and radiated from the pipe to the surrounding mud or sand as sonic waves. Waves radiated directly from the pipe in this case, by virtue of the sonic coupling between the beam and the pipe, act to fluidize the earth material around the pipe, and thereby provide conditions under which the pipe will lower itself in the earth material. In the illustrative case, the lowering of the pipe results partly by sonic wave radiation from the bar, partly from the pipe, and partly by reason of the weight of the beam being imposed on the pipe. It will be appreciated that all these factors may act together, or may be applied separately. Specifically, sonic radiation from the pipe tends to lower the pipe, irrespective of additional radiation from the beam, and irrespective of the loading of the pipe by the beam. It is accordingly evident that sound wave radiation from the pipe, in absence of the other factors, constitutes a practice of the invention. The basic requirement, in this case, will be seen to be merely sonic coupling of a sonically vibratory member to the pipe, whereby the pipe vibrates sonically, and radiates sonic waves into the soil packed therearound. Another method of sonically coupling the sonically vibratory member to the pipe, to accomplish vibration in the pipe and radiation therefrom, is to locate the vibratory member close to the pipe, so as to accomplish the sonic coupling through the soil. FIGS. 9 and 10 show the vibratory beam 137 crossing the pipe line 125 in sufficiently close proximity to achieve a degree of such coupling.

To complete the description of the operation of this embodiment of the invention, it only remains to mention that the barge or other vehicle 130 is towed gradually along the length of the pipe line, the vibratory bar 137 carried thereby acting to fluidize the earth material as it passes, and causing the pipe line to gradually and gently lower in the earth material, as indicated in FIG. 9. The hook members 168 of course slide along the pipe line in this performance. After the apparatus has passed on, the fluidized earth material, mud, or sand, shortly settles and compacts, and the pipe line is thus permanently laid below the ground surface.

FIGS. 17 to 24 show another system for lowering a pipe line in earth material and the system here shown was specifically designed to lower a pipe line, already buried to a depth of a few feet, to a greater depth, such as to twenty feet, the specific earthen medium being in this case glacial till material forming mud flats in an ocean inlet. Again, however, such environment is merely one possible application, and others comprise the sinking of a pipe line in any field of earthen material capable of being sonically fluidized by the invention.

In this case, a conveyance or vehicle such as a barge or sledge 200 is provided, adapted for towing over the mud flats 201 by a tow line 202 and a crawler type tractor vehicle fragmentarily indicated at 203. This tractor vehicle is shown to have a power winch or winding drum 204 for taking in the tow line 202. Thus the tractor vehicle may tow the barge by driving ahead, or by remaining stationary, while the winch 204 is operated.

The barge supports, by means of pivotally mounted boom 210, cable 211 and sling 211a, a horizontal cross beam 212, which may comprise an elastic steel pipe, and projecting downwardly from the center region of the underside of this beam or pipe 212 are two hollow elastic rods 213, spaced horizontally and longitudinally of the beam. The rods 213 are screwthreaded at the top into a mounting block 214 that is firmly supported under and against the under side of pipe 212 by a suitable hanger 215 (FIGS. 19 and 20). The lower ends of rods 213 are capped, as indicated at 216, and the rods are equipped with spaced sound wave radiator fins 217. Mounting block 214 has a water passage 218 communicating with the interior of both hollow rods 213, and a water supply hose 219 is coupled to this passage. The hollow rods 213 are furnished along their lengths with water jet discharge orifices 220, directed generally forwardly, i.e., in the direction of forward travel of barge, and therefore of the rods 213. The orifices are also preferably directed somewhat inwardly, so that the water jets issuing therefrom impinge on the sand between the two rods 213. The rods 213 are composed of elastic material, as steel, and longitudinally directed resonant standing wave vibration is set up in the two rods during operation. A half-wave length standing wave diagram is depicted immediately to the right of the rods 213 in FIG. 19, and it will be understood that the width dimension of this diagram represents the vibration amplitude at corresponding points along the rods 213. Velocity antinodes occur at the top, as at V, and nodes N occur at the midpoints.

A longitudinal standing wave can be induced to occur in each of the two rods 213 in various ways, but I prefer to accomplish this purpose by producing a lateral standing wave, of one full wavelength, in the tubular beam 212. Such a standing wave is represented in the diagram immediately above the beam 212 in FIG. 19, and it will be seen that velocity antinodes V' occur at the two ends of the beam, and at the mid-point. To produce this lateral standing wave in the beam 212, I utilize a lateral wave generator 230 in the beam in the region of one of the velocity antinodes, in this case, adjacent one of the extremities of the beam 212.

The illustrative generator 230 shown for this purpose in FIGS. 23 and 24 is substantially that more fully disclosed in FIGS. 5–9 of my prior Patent No. 2,960,314, issued November 15, 1960. This generator 230 has a cylindrical housing 231, which is received into cylindrical beam 212 and fitted tightly in a circular aperture 232 in one side of the latter. Air under pressure introduced to the generator via conduit 233 and passage 234, flows through passages 235, and is discharged tangentially, via passages 236 (FIG. 24) into a cylindrical chamber 237 containing an inertia rotor in the form of a steel disk 238, of smaller diameter than the chamber. This air so introduced into chamber 237 impinges on disk or rotor 238, and drives it rapidly around the raceway formed by periphery of chamber 237. Spent air escapes through ports 239, and thence via the large opening provided at 240.

The orbital or spin frequency of the rotor 238 may be governed by regulation of the pressure of the air supplied to air conduit 233. This air is supplied via a coupling means at 242 and an air hose 243 leading from any pressure-controllable source of supply, not shown. By suitable regulation of this air pressure supplied to generator 230, the spin frequency of the inertia rotor may be caused to approximate the resonant standing wave frequency of the beam 212 for the mode of lateral standing vibration represented in the diagram above the beam in FIG. 19. At this time, the component of force exerted by the spinning rotor 238 on the housing of the generator 230, and therefore on the beam 212, in a direction laterally of the beam, excites the lateral standing wave in the beam 212. Accordingly, the end and center regions of the beam 212 at the velocity antinode V' vibrate vertically with a substantially component of elastic deformation amplitude. The center region of the beam 212 is acoustically coupled to the upper ends of the hollow rods 213, and alternating forces of large magnitude are applied from the center region of the beam 212 to the upper ends of the rods 213, in directions longitudinally of said rods.

It is desired that these alternating force applications cause elastic longitudinal resonant standing wave vibration in the rods 213, preferably of half-wave length. Accordingly, the rods 213, which are of course of elastic material, are given lengths corresponding to a half-wave length for a longitudinal wave in the material of the rods, at the frequency of resonant lateral vibration of the beam 212. Longitudinal resonant standing wave vibration is thus produced in the rods 213.

This sonic vibration of the rods 213, and of the sonic wave radiation fins 217 thereon, results in radiation into the surrounding earth material of powerful sonic waves, which produce the fluidization effect on the earth material as discussed hereinabove.

It will be appreciated that the longitudinal half-wave length wave produced in each of the rods 213 will be of greatest amplitude in the end portions of the rods, and will gradually reduce to zero at the node at the midpoint. Accordingly, it is a further feature of the system that the sonically vibrating rods 213 are bodily reciprocated in a vertical direction, through any desired stroke distance, during the operation of the system. This bodily reciprocation may be at a much lower frequency than that of the sonic standing wave frequency in the rods, and may typically be from 10 to 20 strokes per minute. This may be accomplished by alternately elevating and lowering the cable 211 carrying the cross beam 212 which both carries and vibrates the rods 213, using a hoisting drum 250, whose power drive mechanism, not shown, employs any suitable conventional reversing means.

FIGS. 17 and 18 show the system in operation. The barge 202 is dragged slowly toward the right over the mud flats 201, and over the pipe line 260. At the right of the barge this pipe line is shown beneath overcover of a few feet in thickness, and to the left of the barge, the pipe line is shown considerably further lowered. The two hollow vibratory rods are on opposite sides of the pipe line, as indicated in FIG. 19. Hollow rods 213 are excited to undergo longitudinally oriented standing wave vibration, and are slowly lowered and elevated. The untreated mud or sand region is indicated by the reference numeral 201a, and that which has been sonically fluidized by the reference numeral 201b. The water jets issuing from the orifices 220 in the rods 213 cooperate with the sonic wave vibrations radiated into the mud or sand to aid in fluidizing the latter and so facilitate the forward travel or "working" of the rods 213 through the sand or soil. The process involves the making, in the first instance, of two vertical groove-like regions wherein the soil material is sonically fluidized by the vibrating rods 213, and fluidized further, or washed away, by action of the water jets. The rods 213 progress into these grooves as the soil material is fluidized and/or washed away. The wall of material between these grooves (wherein the pipe line resides) may, depending upon local circumstances, become fluidized, by the sonic wave action alone, sufficiently for the pipe line to descend, so that the water jets would not be required. However, in this embodiment of the invention, the water jets are deemed to be desirable, and their partial inward direction results in final fluidization or breakdown of the wall of material between the two aforementioned grooves of fluidization.

As a consequence of the fluidization of the mud or sand material in the region 201b, the pipe line sinks therein, as partially indicated in FIG. 17. This view shows the pipe line angling downward, but only part way down to the finally desired level B. It will be readily understood, however, that the pipe line will fall to the bottom level B some feet behind the barge, provided the condition of fluidization is maintained for a long enough time period. The water jetted into the soil aids this condition. In some cases, enough water may be introduced to form a slurry, and this slurry then pumped away, using a suction line and pump, not shown. An open ditch can, in fact, be formed by this process, and constitutes one practice of the invention. Drawing attention to the localized portion of the pipe line just ahead of the rods 213 (under the rearward end portion of the barge), it will be seen that this portion of the pipe has undergone a gentle downward curve, and has already dropped somewhat, even though it is ahead of the rods 213. This can take place for two reasons: first, the rods send sonic waves sufficiently far forwardly thereof to accomplish a beginning fluidization effect some feet forwardly thereof; and second, the trailing portion of the pipe line, sinking in the fully fluidized region 210b, pulls downward on the portion of pipe line immediately forward of the rods 213. These effects acting on the earth material and on the pipe line account for a downward curving of the latter beginning at a point which may be well forward of the rods 213.

FIGS. 25 to 29, inclusive, show somewhat diagrammatically, a further embodiment and application of the invention. The general objective is here again to provide a process and apparatus for forming a trench in the earth, and second, for laying a pipe line in such trench. The process and apparatus in this form are adapted for working in either sandy or clayey type soils. The ground surface of the soil into which the pipe line is to be laid is indicated generally by the numeral 300, and the pipe line resting thereon by numeral 301. The purpose is to lower the pipe line to the depth level indicated by the reference numeral 302.

The apparatus comprises a conveyance in the illustrative form of an elongated, generally rectangular, parallel-walled and horizontally disposed housing or tunnel structure 305, which is made up of two component, parallel and horizontally-spaced, rectangular tube or compartment structures 306, extending the full length of the member 305. The two structures 306, of rectangular cross section, are disposed with their longer sides in vertical planes, as shown in FIGS. 27 and 28; and as here shown, they are provided with and connected by a common top wall 307. Bottom walls 308 ride along on the surface of the trench bottom formed by the later described plow-head 310. The inside walls of the structures 306 are connected to one another and suitably braced by means of shafts 311, which serve as axles for pipe-supporting and guide rollers 312, 313, 314 and 315. The rollers 313 and 314 are illustrated in elevation in FIGS. 27 and 28, and it will be understood that the rollers 312 and 315 are similar and similarly mounted. As appears from FIG. 26, however, the first roller 312 is mounted at an elevation to support pipe line 301 at ground surface level. The second roller 313 supports the underside of the pipe line at a somewhat lower elevation. The pipe line then passes under the third roller 314, which rides over the pipe line. The final roller 315 again rides over the pipe line, which at this point is substantially at its final, lowered position.

A pair of sonically vibratory elastic steel shafts 320 and 321 extend, at an acute angle to horizontal, through the top wall member 307, at about the mid-point of the length of member 305, into the two hollow structures 306, projecting rearwardly somewhat beyond the point of passage through top wall 307, and forwardly a short distance beyond the forward end of the structure 305. Apertures 324 in top wall 307 pass the shafts 320, preferably with a small working clearance. The mid-points of the shaft 320 and 321 are provided with spaced collars 326, forming grooves engaged by a pair of mounting pins 327 fixed to the side walls of the respective structures 306.

The rearward extremities of the shafts 320 and 321 are interconnected by a cross-head 330, and affixed to the latter is a sonic vibration generator 331. This generator 331 is of a type heretofore described, and is driven from a prime mover 324 mounted on structure 305 toward the rear of the latter, as later described in more particular.

The forward extremities of the shafts 320 and 321 are secured, as by welding to inside surfaces of the aforementioned plow-head 310. This plow-head 310 has opposite, concavely curved side surfaces 340, which are perpendicular to a horizontal base surface 341, and which converge to a point 342 at base surface 341. A front and top surface 343 rises from point 342, first at a relatively sharp vertical angle, then more steeply, and finally becoming nearly or substantially horizontal at the top and rear.

Operation of the sonic vibration generator 321 at a frequency for longitudinal resonant standing wave vibration, in the shafts 320 and 321, preferably in the halfwavelength mode, results in a resonant longitudinal standing wave pattern in said shafts as represented in the diagram drawn parallel to the shafts 320 and 321 in FIG. 26. Velocity antinodes V and V′ appear at the extremities of the shafts, with a node N at the mid-points, where the shafts are mounted. The plow-head 310 is thereby sonically vibrated against the soil, and when the structure 305 and the shafts 320 and 321 are moved forwardly, as by tow line 350 and a tractor vehicle, not shown, the vibratory plow-head moves or works readily into and displaces the soil ahead of it. The performance of the vibratory plow-head on the soil will be explained hereinafter.

The rearward end portions of the shafts 320 and 321 are suitably yieldingly supported by steel cables 352 connected to a frame 353 erected from housing 305, and cables 354 connected directly to housing 305.

Generator 331 is of the same type as illustratively shown in FIG. 3, and described hereinabove, and as shown in more detail in my application Serial No. 131,385, filed March 21, 1962, also mentioned hereinabove. Generator 331, however, is mounted with respect to the shafts 320 and 321, and operates at such resonant frequency, as to deliver alternating forces to the extremities of the shafts 320 and 321 which are oriented primarily longitudinally of said shafts.

Referring particularly to FIG. 29, generator 331 has an exterior housing 370 which is generally cylindrical, with its axis at right angles to and intersecting the axes of the two shafts 321, and which is mounted in any suitable manner on the crosshead 330 connecting the shafts 320 and 321. Housing 370 embodies a body member 371 having a cylindrical bore 372 co-axial with the axis of the housing, and the housing is completed by end plates 373 and 374. The bore 372 forms a raceway for a cylindrical orbital inertia rotor, of somewhat smaller diameter than said bore, generally designated by numeral 374. The rotor 374 embodies a cylindrical inertia roller 375, of somewhat less diameter than that of the raceway bore 372, and which is rotatably mounted on an axle 376 projecting axially from the hub portion of a spur gear 377. The pitch circle of spur gear 377 is of substantially the same diameter as the roller 375. Gear 377 meshes with an internal gear 378 located within body member 371 concentrically with the corresponding raceway bore 372, and whose pitch diameter is substantially of the same diameter as said bore.

The rotor 374 moves in an orbital path about its raceway 372 as a guide, bearing against the surface of said bore by centrifugal force. Gear 377 runs in mesh with internal gear 378. To maintain the roller 375 in proper engagement with raceway 372 while the generator is at rest, or coming up to speed, the axle 376 of the rotor is provided with an axial pin 380 which rides around and is guided by a circular boss 381 projecting inwardly from end plate 374 co-axially with the raceway bore 372.

The rotor 374 is driven through a universal joint coupling 382 connected between a conically gyratory driveshaft 383 and the hub of spur gear 377. Conically gyratory shaft 383 is in turn driven through universal joint 385 from a shaft 386 carrying bevel gear 387, which is in mesh with bevel gear 388 on shaft 389, and the latter is driven through gear box 390 from the aforementioned engine 324 mounted on the rearward end portion of housing structure 305.

Operation of the vibration generator 331 is as follows: Rotation of shaft 389, powered from engine 324, causes spur gear 377 to roll around internal gear 378, the shaft 383 moving in a conical gyratory fashion. Inertia roller 375 rolls on the bearing surface afforded by the bore 372, so that the rotor 374 moves in an orbital path. The centrifugal force developed by the rotor moving in this orbital path results in exertion of a rotating force on the generator housing 370, the force vector rotating about the axis of the raceway 372. The roller 375 turns at nearly the same rate of rotation as the gear 377, with any slight variation or creep therebetween accommodated by the rotatable mounting of the roller on shaft 376. Thus a gyratory force is exerted on the body or housing 370, and this gyratory force is transmitted to and exerted on the crosshead 330 connecting the two steel vibratory shafts 320 and 321. As will be clear, the gyratory force applied to the extremity of each of shafts 320 and 321 may be resolved into an alternating force component extending longitudinally of that shaft, and a second component of alternating force disposed transverse of the shaft. Engine 324 is speed regulated to drive the inertia rotor of the generator 331 at a cyclic frequency which approximates or is in the region of the resonant frequency for longitudinal standing wave vibration of the shafts 320 and 321. Under this condition the shafts 320 and 321 vibrate, in synchronism with one another, in a resonant standing wave pattern, such as the half-wavelength fundamental standing wave pattern diagrammed in FIG. 26. The extremities of the shafts 320 and 321 thus vibrate in directions longitudinally of said shafts, at resonantly magnified amplitude, and this magnified amplitude of course is participated in by the crosshead 30 and by the generator 331. Under these conditions, the whole generator body 370 moves in a flat elliptical path, with the major axis of the ellipse parallel with the shafts 320 and 321, and with the minor axis thereof transverse to the shafts 320 and 321. The net result is that the shafts 320 and 321 are thereby set into longitudinal standing wave vibration, and undergo elastic longitudinal vibration in the half-wavelength longitudinal mode shown in the diagram of FIG. 26. On the other hand, since the lateral component of force developed by the generator 331 is at a frequency which does not approximate the frequency of the shafts 320 and 321 for a lateral mode of resonant vibration of said shafts, only a minor degree of lateral vibration will occur. Thus the generator describes the flattened elliptical path mentioned, the shafts 320 and 321 vibrate at substantial amplitude in the longitudinal standing wave mode, and any lateral component of vibration is minor and negligible.

The longitudinal resonant standing wave vibration so engendered in the shafts 320 and 321 is imparted to the plow-head 310, and it will be borne that the vibratory amplitude of the shafts 320 and 321 is relatively large at their forward extremities, where the plow-head 310 is mounted.

The plow-head, with this vibratory action, may act on the soil somewhat differently depending upon the nature of the soil. Assume first a more or less clayey soil. The plow-head is sonically coupled to the soil by being forcibly engaged therewith, as, for example, by exertion of a tension in a tow line 350 by which the apparatus is moved forwardly by a suitable tractor vehicle, not shown. A sonic wave is thereby radiated into the soil, and produces a sonic fluidization effect of the general nature mentioned earlier. Under this action the plow-head is enabled to penetrate or work itself with reduced difficulty into the soil ahead of it. The pressure exerted by the vibrating plow-head on the soil to the sides of and above the plow-head causes this soil to rise, divide bi-laterally, and spill to both sides. An open trench can thus be formed. Some soil may spill in back of the plow-head, and enter the front open end of the longitudinal channels of the oncoming structure 305, gradually working through the length of the latter, and being finally discharged from the trailing end. If a large amount of soil tends to accumulate within the channels of the structure 305, streams of water can be directed into these channels to wash the material through.

It will be seen that the apparatus as thus described digs a trench in the soil as it is moved forwardly, and may be used simply to form a trench in the earth. However, in fairly sandy soil, a substantially larger proportion of the soil elevated by the plow head may fall back into the trench, and leave it in a partially or even substantially refilled condition. As stated earlier, when the apparatus is used in more clayey soils, the soil turned up by the plow-head tends to be more completely turned laterally, to the sides of the trench, leaving a more completely open trench. In the case of such soils, the action of the sonically vibratory plow-head is again to loosen the soil, and condition it for easy flow. It rises readily, and, holding more together than the sandy soil, turns readily to the two sides of the plow-head to come to rest at the two sides of the trench made thereby.

When the process is employed for the laying of a pipe line simultaneously with the forming of the trench, the pipe line 301 is "threaded" through the apparatus as shown in the drawings and described hereinabove. The soil in back of the plow-head is removed leaving an open or partially open trench, to an extent depending upon the nature of the soil. The pipe is lowered, from ground surface level to the level 302, in accordance with the gently curved path determined by the rollers 312 to 315. The process and system of FIGS. 25–29 tends, as explained hereinabove, to leave the trench partially or wholly open, or nearly refilled, depending upon soil conditions. If left open, it is of course subsequently filled by scraping in the soil deposited to the two sides thereof.

The invention has now been illustrated by illustrating and describing various forms and embodiments thereof. It will be understood that these are merely illustrative of and not restrictive on the invention, and that numerous additional modifications are within the scope of the appended claims.

I claim:

1. The method of inserting a member into the ground along a path including progressively sonically fluidizing ground soil along a trench-shaped region in the ground that includes:
   acoustically coupling a surface area of a vibratory sonic wave radiation member in sonic energy transmission relationship to the soil in situ in the ground,
   progressively moving said radiation member along the ground in a given path,
   simultaneously sonically vibrating said radiation member, while so coupled, with a sonic impedance output which delivers substantial sonic power into a resistive impedance load, so that the ground soil becomes progressively sonically fluidized in a trench-shaped region extending along said given path and inserting a member into said fluidized soil.

2. The method of inserting a member into the ground along a path including progressively sonically fluidizing ground soil along a trench-shaped region in the ground that includes:
   acoustically coupling a sonic wave radiation surface area of a vibratory sonic wave radiation member to the soil in situ in the ground by lowering the portion of said vibratory member having said area to a position below the top level of the ground soil with said area engaged against the soil,
   resonantly vibrating said vibratory member, and, simultaneously therewith,
   progressively moving said radiator member along the ground in a given generally horizontal direction with said wave radiation area remaining positioned below the top level of the ground soil and engaged thereagainst,
   whereby the ground soil in advance of said radiation area of said vibratory member becomes fluidized and said portion of said vibratory member moves progressively therethrough and progressively fluidizes the soil in a trench-shaped region.

3. The subject matter of claim 2, and the further step of removing soil from said trench-shaped region while the soil is in said fluidized state by causing a jet stream of fluid to impinge on the soil in such region.

4. The method of forming an open trench in the ground, that includes:
   acoustically coupling a surface area of a vibratory sonic wave radiation member in sonic energy transmission relationship to the soil in situ in the ground,
   progressively moving said radiation member along the ground in a given path,
   simultaneously sonically vibrating said member, while so coupled, with a sonic impedance output which delivers substantial sonic power into a resistive impedance load, so that the ground soil becomes progressively sonically fluidized in a trench-shaped region extending along said given path,
   and removing the fluidized soil, so as to form an open trench.

5. The method of moving a pipeline in a direction generally transversely to the length in ground soil,
   said pipeline being in gravity engagement with the ground soil, that includes:
   progessively fluidizing the ground soil in a region extending along and beside the pipeline, by
   acoustically coupling to the ground soil in said region a sonic wave radiator means in sonic energy transmission relationship,
   moving said coupled radiator means progressively along the pipeline, and simultaneously sonically vibrating said radiator means, while so coupled, with a sonic impedance output which delivers substantial sonic power into a resistive impedance load.

6. The method of claim 5, using two resonantly driven sonic radiators, one on each side of the pipeline and extended down into the soil, and moving the two radiators simultaneously and side by side against the soil.

7. The subject matter of claim 5, including the further step of ejecting water under pressure against the soil in the region of the sonic radiator to aid in displacement of the sonically fluidized soil.

8. The method of claim 5, wherein the sonic wave radiator means is resonantly driven and is sonically coupled to the ground soil by extending it down into the soil, and said wave radiator means is held at least in part below the ground surface while being progessively moved along the pipeline.

9. In apparatus for forming a trench of fluidized soil in the ground, the combination of:

a conveyance movable along the ground on the line of the proposed trench, sonic vibratory wave radiator means supportable on said conveyance said vibratory radiator means including an acoustically vibratory coupling element having an extended area output surface positioned for face-to-face acoustic coupling engagement with the soil and being movable with said conveyance along said line of the proposed trench with said coupling element acoustically coupled to the soil, a sonic wave generator on said conveyance acoustically coupled to said radiator means, and said generator having an impedance output operable to deliver substantial sonic power into a resistive impedance load.

10. The subject matter of claim 9, wherein said sonic wave radiator means comprises a sonically vibratory member movable along and in engagement with the surface of the ground.

11. The subject matter of claim 9, wherein said sonic wave generator is acoustically coupled to said conveyance, so as to apply a shaking force to said conveyance, and said vibratory sound wave radiator means comprise ground engaging wheels for said conveyance.

12. The subject matter of claim 9, wherein said sonic radiator means comprises a pair of parallel, substantially vertically disposed resonantly vibratory rods, disposed side by side at right angles to the direction of conveyance travel, and engageable with the ground to a depth below ground level.

13. The subject matter of claim 9, wherein said radiator means comprises a relatively long, generally horizontally-disposed, flexible, elastic beam suspended from and trailing behind said conveyance, said generator means being coupled to the forward end portion of said beam and said generator means being operable at a resonant frequency of said beam.

14. The subject matter of claim 9, wherein said sound wave radiator means comprises elastic beam means adapted for elastic vibration in a longitudinal standing wave pattern having a velocity node intermediate its ends, and a plow-head means on the forward extremity of said beam means, means supporting said beam means on said conveyance in a generally longitudinal disposition therein, with the point of support of said beam means being at said velocity node of said standing wave pattern, and with said plow-head means in engagement with the ground, said standing wave pattern including also a velocity antinode at the forward extremity of said beam means, and at least one additional velocity antinode, with said sonic wave generator acoustically coupled to said beam means at one of said velocity antinodes for applying to said beam means a cyclic force oriented longitudinally of the beam means, so as to engender longitudinal standing wave vibration in said beam means.

15. The subject matter of claim 9, wherein said sonic wave radiator means comprises a sonically vibratory member engaging the ground to a depth below ground level.

16. The subject matter of claim 15, wherein said sonically vibratory member comprises a generally vertically disposed elastic rod, and said sonic wave generator and coupling means are arranged for setting said rod into elastic standing wave vibration in a gyrational mode.

17. The subject matter of claim 15, wherein said sonically vibratory member comprises a generally vertically disposed elastic rod, and said sonic wave generator and coupling means are arranged for setting said rod into elastic standing wave vibration in a longitudinal mode.

18. The subject matter of claim 15, wherein said sonically vibratory member comprises a generally vertically disposed elastic rod, and said sonic wave generator and coupling means are arranged for setting said rod into elastic standing wave vibration.

19. The subject matter of claim 18, including also means for vertically reciprocating the rod bodily.

20. The subject matter of claim 18, wherein said generator and coupling means include an elastic horizontal beam acoustically coupled to the upper extremity of said vertically disposed rod, said sonic wave generator being acoustically coupled to said beam in a manner to set up therein a lateral standing wave with vibration occurring in a vertical plane.

References Cited by the Examiner

UNITED STATES PATENTS

| Re. 23,963 | 3/1955 | Collins | 61—72.4 |
| 2,879,649 | 3/1959 | Elliott | 61—72.4 |
| 3,033,543 | 5/1962 | Bodine. | |
| 3,100,382 | 8/1963 | Muller | 61—63 X |

FOREIGN PATENTS 510,064   7/1939   Great Britain.

JACOB L. NACKENOFF, Primary Examiner.

EARL J. WITMER, CHARLES E. O'CONNELL, Examiners.

R. A. STENZEL, Assistant Examiner.